(12) United States Patent
Mimoto

(10) Patent No.: US 7,177,042 B2
(45) Date of Patent: Feb. 13, 2007

(54) FACSIMILE APPARATUS AND ACCOUNT-SELLING SYSTEM USING THE SAME

(75) Inventor: Yasuharu Mimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 957 days.

(21) Appl. No.: 09/985,427

(22) Filed: Nov. 2, 2001

(65) Prior Publication Data

US 2002/0055896 A1 May 9, 2002

(30) Foreign Application Priority Data

Nov. 6, 2000 (JP) .............................. 2000-336855

(51) Int. Cl.
*G06F 15/00* (2006.01)
*G06K 1/00* (2006.01)

(52) U.S. Cl. .................... 358/1.15; 705/28; 705/30; 705/35

(58) Field of Classification Search .............. 358/1.14, 358/1.15; 399/8, 10, 23, 27, 12; 705/26, 705/29, 28, 30, 35; 714/47, 4
See application file for complete search history.

(56) References Cited

U.S. PATENT DOCUMENTS 6,023,593 A * 2/2000 Tomidokoro ................ 399/8

(Continued)

FOREIGN PATENT DOCUMENTS

JP 4-151765 5/1992

(Continued)

OTHER PUBLICATIONS

Japanese Office Action dated Apr. 15, 2003 with Partial English Translation.

Primary Examiner—Kimberly Williams
Assistant Examiner—Satwant Singh
(74) Attorney, Agent, or Firm—McGinn IP Law Group, PLLC

(57) ABSTRACT

An account-settling system comprises a buyer-side facsimile apparatus and a seller-side facsimile apparatus. These facsimile apparatuses are connected to the Internet through LANs, respectively. The buyer-side facsimile apparatus comprises, in addition to a facsimile section, an operation section, an apparatus-status monitoring section, a notice data generating section, an SSL encoding section, an HTTP client section, a TCP/IP protocol control section, and a network control section. The HTTP client section is an Internet-connecting unit. The buyer-side facsimile apparatus is connected to the LAN. The operation section is operated to input the account data representing the number of the buyer's credit card and the validation period thereof. The apparatus-status monitoring section detects the amount of any expendable that remains in the facsimile apparatus. The notice data generating section supplies account data and expendable-type data to the seller. The SSL encoding section encodes data, thereby keeping the data secret. The seller-side apparatus includes an operation section, a storage section, a notice data analyzing section, an SSL decoding section, an HTTP server section, a TCP/IP protocol control section, and a network control section. The notice data analyzing section analyzes the notice data received through the Internet from the buyer-side facsimile apparatus and performs settlement based on the analyzing result.

10 Claims, 4 Drawing Sheets

U.S. PATENT DOCUMENTS

| | | |
|---|---|---|
| 6,233,408 B1 * | 5/2001 | Allen .............................. 399/8 |
| 6,233,409 B1 * | 5/2001 | Haines et al. .................. 399/10 |
| 6,405,178 B1 * | 6/2002 | Manchala et al. ............. 705/29 |
| 6,430,711 B1 * | 8/2002 | Sekizawa ...................... 714/47 |
| 6,529,692 B1 * | 3/2003 | Haines et al. .................. 399/27 |
| 6,714,744 B2 * | 3/2004 | Arima .......................... 399/23 |
| 6,798,997 B1 * | 9/2004 | Hayward et al. ............. 399/12 |
| 6,892,317 B1 * | 5/2005 | Sampath et al. ................ 714/4 |
| 2003/0158790 A1 * | 8/2003 | Kargman ...................... 705/26 |

FOREIGN PATENT DOCUMENTS

| | | |
|---|---|---|
| JP | 4-265060 | 9/1992 |
| JP | 7-87212 | 3/1995 |
| JP | 7-239825 | 9/1995 |
| JP | 10-309851 | 11/1998 |
| JP | 2000-200236 | 7/2000 |

* cited by examiner

Fig. 4

[APPARATUS DATA]
  NAME OF APPARATUS: FAX-AAAAA
  SERIAL NUMBER:11111

[EXPENDABLES ORDERED]
  TYPE OF IMAGING UNIT: AAAAA-11111-111

} DATA ITEMS THE APPARATUS HAS AUTOMATICALLY GENERATED

---

[SELLER]
  △△△ CO. LTD.
  http://www.△△△.com.

} DATA THE USER HAS SELECTED

---

[BUYER-ACCOUNT DATA]
  CREDIT CARD NO. :3333-3333-3333-3333
  VALIDATION PERIOD:OCT. 2000

[DESTINATION]
  6535 North State Highway 161,
  Irving TX 75039-2402
  TEL:1-214-262-1111

} DATA THE USER HAS INPUT

FACSIMILE APPARATUS AND ACCOUNT-SELLING SYSTEM USING THE SAME

BACKGROUND OF THE INVENTION

1. Field of the Invention

The present invention relates to a facsimile apparatus and an account-settling system using the facsimile apparatus. More particularly, the present invention relates to a technique for automatically ordering expendable supplies or the like, through the Internet, and performing electronic settlement of accounts.

2. Description of the Related Art

Prior art relating to such a facsimile apparatus and such an account-settling system is disclosed in, for example, Japanese Laid Open Patent Application (JP-A-Heisei, 4-151765) that is entitled "Method for Automatically Ordering Expendable Supplies by using a Facsimile Apparatus." In this method, the facsimile apparatus performs inventory control on expendables. When numbers of the expendables in stock decrease, the facsimile apparatus automatically makes orders for the expendables. More concretely, the facsimile apparatus comprises an expendable management information storage section, a remainder number management control section, and a slip creating section. The expendable management information storage section stores expendable management information which includes the name of the expendables, the present number of the remainder, the ordering start-up number of the remainder, the ordering information and the like. Whenever the expendables are exchanged, the remainder number management control section subtracts the number of the expendables exchanged, from the number of the remainder, then compares the difference with the ordering start-up number of the remainder. If the difference is equal to the ordering start-up number of the remainder, the slip creating section creates an order slip. The order slip is transmitted to the supplier of the expendables. Thus, an order of the expendables is automatically executed.

Japanese Laid Open Patent Application (JP-A-Heisei, 7-87212) discloses "Facsimile Apparatus". This facsimile apparatus comprises detecting means provided in the printer section. The detecting means detects the amount of expendable such as toner, which remains in the printing section. When the detecting means detects that the expendable has run out, a communications section dials the telephone number of the supplier that has been previously registered by an operation section. The supplier is thereby automatically informed of a fact that the expendable has been used up in the facsimile apparatus. This makes it unnecessary for the user of the facsimile apparatus to perform an inventory control of the expendable. Further, it is possible to prevent from bringing about hindrance to the operation such as the reception because the expendables run out.

Japanese Laid Open Patent Application (JP-A-Heisei, 7-239825) discloses "Method of Informing Status and Network System Using the Same". In this technique, when toner runs out in a copying machine, the copying machine transmits data indicating this fact into a network. A facsimile apparatus connected to the network receives the data, creates an order slip for toner, and transmits the order slip to the facsimile apparatus having a predetermined destination address through the public line. In this technique, the facsimile apparatus may be replaced by a computer and the printer connected to the computer. In this case, the display on the computer may display the message informing that paper sheets are out of stock. In this technique, because the expendable can be automatically replenished, the user need not perform an inventory control on the expendable.

Japanese Laid Open Patent Application (JP-A-Heisei, 4-265060) discloses "Facsimile Apparatus". This facsimile apparatus comprises a sensor, a memory, and an order-issuing section. The sensor detects a near out-of-stock of an expendable. The memory stores the data representing an order for the expendable and the telephone number of the supplier of the expendable. The order-issuing section extracts the data about the order for the expendable and transmits the data by facsimile when the sensor detects a near out-of-stock of the expendable. This facsimile apparatus has an order-issuing button, which may be pushed to transmit an order for the expendable that is almost out of stock.

As described above, when the expendable is fount to be almost out of stock, an order slip is sent to a maintenance center or an agent, demanding for the replenishment of expendable. In the margin transactions carried out by using credit cards and debit cards, the maintenance center or the agent, i.e., the seller, receives the card information recorded in a card, which represents the number of the card and the validation period thereof. Then, to ascertain the validity of the card, the seller inquires for the bank, the credit sales company or any other finance company. If the card information recorded in the card is valid and correct, the seller settles an account.

Recently, more and more sellers have opened shops (virtual shops) in the Internet, conducting electronic transactions in the virtual shops. At the virtual shops, small-scale businesses and individual users can buy expendables directly from the seller, without entering a maintenance contract with the maintenance center or the agent. As a result, an outlet on the side of the seller is expanded and a procedure on the side of the buyer are simplified.

The conventional facsimile apparatus described above only has the function of creating an order slip for the replenishment of expendable and the function of transmitting the order slip to the maintenance center or the agent. No accounts can be automatically settled by way of the facsimile apparatus. When the maintenance center or the agent receives the order slip from the facsimile apparatus, they must confirm directly with the telephone or the like to the buyer. Conversely, the buyer must telephone the maintenance center or the agent to demand that the center or agent should settle an account as soon as possible. Both the seller and the buyer have to spend much time to settle an account. To make the matter worse, the reception of an order and the settlement of an account may delayed in some cases due to human factors. This results in a delay of delivery of the expendable, which ultimately extends the non-operating period of the facsimile apparatus.

SUMMARY OF THE INVENTION

The present invention is accomplished to solve the above-mentioned problem with the prior art. An object of the invention is to provide a facsimile apparatus and an account-settling system using the facsimile apparatus.

To accomplish the above object, a facsimile apparatus according to a first aspect of the present invention comprises an operation section, an apparatus-status monitoring section, a notice data generating section and an Internet connecting section.

The operation section is operated to input account data containing a number of a credit card peculiar to a buyer and a validation period of the credit card. The apparatus-status monitoring section monitors condition of expendables. The notice data generating section generates notice data containing the account data inputted from the operation section and expendable-type data of the expendables monitored by the apparatus-status monitoring section to notify to a seller. The Internet connecting section converts the notice data generated in the notice data generating section into data having a format to send out in an Internet.

In the first aspect of the present invention, the facsimile apparatus may further includes an SSL encoding section which encodes to conceal the account data contained in the notice data generated in the notice data generating section. Also, the apparatus-status monitoring section, when the expendables reduce to a predetermined amount, sends the expendable-type data of the expendables to be replenished to the notice data generating section.

To accomplish the above object, an account-settling system according to a second aspect of the present invention comprises the facsimile according to the first aspect of the present invention and a seller-side apparatus which is connected to the buyer-side facsimile apparatus through an Internet. The seller-side apparatus includes a notice data analyzing section that analyzes the notice data received through the Internet from the buyer-side facsimile apparatus and performs settlement based on the analyzing result.

BRIEF DESCRIPTION OF THE DRAWINGS

FIG. 4 illustrates an example of data about the buyer, which is generated by the buyer-side facsimile apparatus according to the preferred embodiment of the present invention and which is transmitted to the seller.

DESCRIPTION OF THE PREFERRED EMBODIMENTS

A facsimile apparatus according to a preferred embodiment of the present invention and an account-settling system using the facsimile apparatus will be described in detail, with reference to the accompanying drawings.

Recently, more and more sellers have opened virtual shops in the Internet, conducting electronic transactions in the virtual shops by using cards such as credit cards and debit cards. They have opened the virtual shops in order to expand their market and simplify the procedure performed between them and the buyers. In the margin transactions by using the cards, an account can be settled when the seller receives account data including the number of the card peculiar to the buyer and the validation period of the card.

Figure 1:
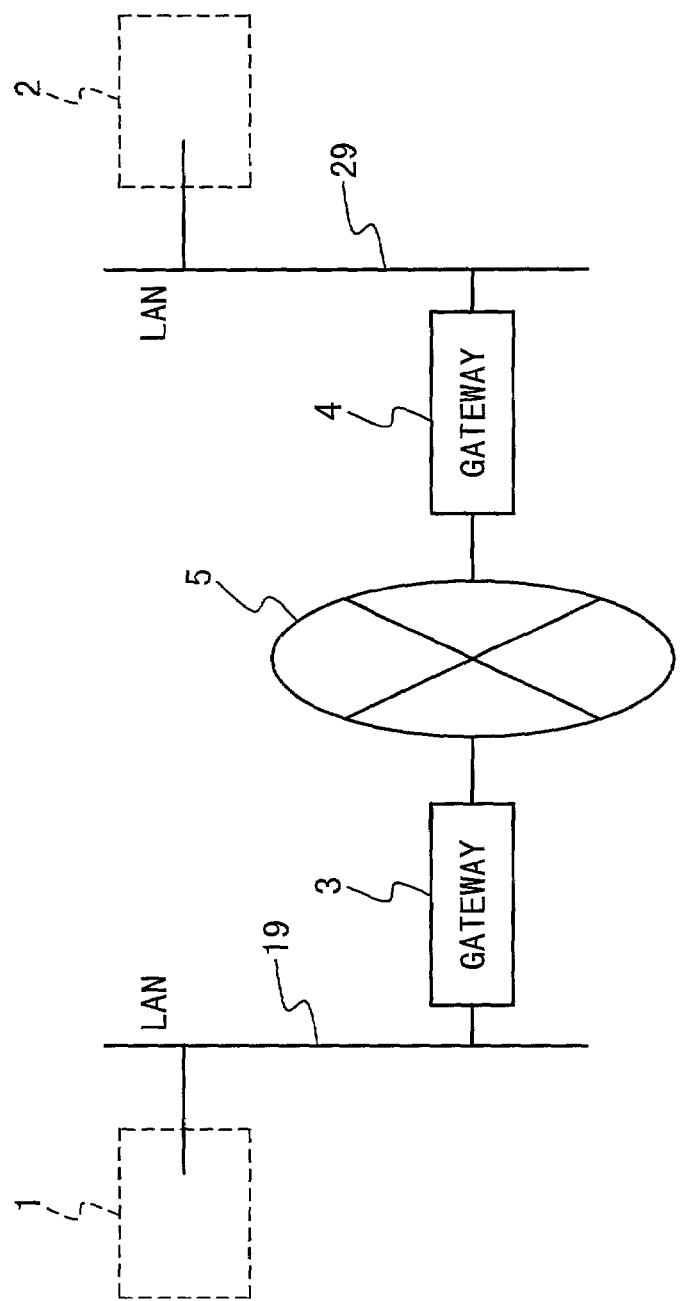
FIG. 1 is a block diagram showing a configuration of an account-settling system according to a preferred embodiment of the present invention, which includes a buyer-side facsimile apparatus and a seller-side facsimile apparatus.

FIG. 1 is a block diagram showing a configuration of an account-settling system that includes a facsimile apparatus according to the present invention. The account-settling system includes a buyer-side facsimile apparatus 1 and a seller-side facsimile apparatus 2. The buyer-side facsimile apparatus 1 is connected to a LAN (Local Area Network) 19. The seller-side facsimile apparatus 2 is connected to a LAN 29. The LANs 19 and 29 are connected to the Internet 5 by gateways 3 and 4, respectively.

In the account-settling system, the buyer-side facsimile apparatus 1 is connected to the LAN 19. Any apparatus connected to the LAN 19 can be connected to any external network via the gateway 3. The seller-side facsimile apparatus 2 is connected to the LAN 29. Any apparatus connected to the LAN 29 can be connected to any external network via the gateway 4. Various terminals can be connected to the LANs 19 and 29. The LANs 19 and 29 are equivalents to the systems installed in organizations such as companies. It should be noted that the seller-side facsimile apparatus 2 may be replaced by a personal computer (PC).

Figure 2:
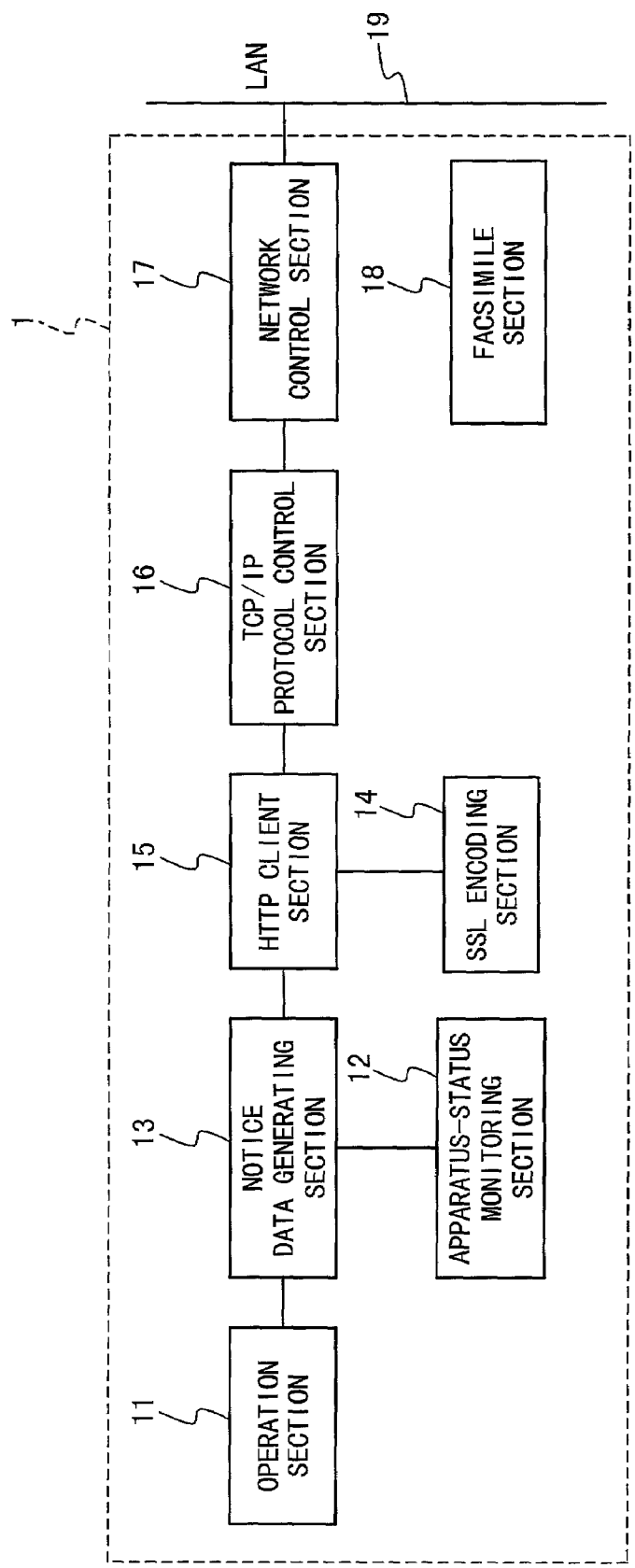
FIG. 2 is a block diagram illustrating a configuration of a buyer-side facsimile apparatus according to a preferred embodiment of the present invention that is shown in FIG. 1.

FIG. 2 is a block diagram illustrating the buyer-side facsimile apparatus 1. This buyer-side facsimile apparatus 1 comprises, in addition to a facsimile section 18, an operation section 11, an apparatus-status monitoring section 12, a notice data generating section 13, an SSL (Secure Sockets Layer) encoding section 14, an HTTP (Hyper Text Transfer Protocol) client section 15, a TCP/IP (Transport Control Protocol/Internet Protocol) protocol control section 16, and a network control section 17. The HTTP client section 15 is an Internet connecting section. As described above, the buyer-side facsimile apparatus 1 is connected to the LAN 19.

The functions of the sections incorporated in the buyer-side facsimile apparatus 1 will be explained, with reference to FIG. 2. The facsimile section 18 performs a reading of data, a recording of data, a facsimile transmitting and receiving of data. The operation section 11 is used to input the account data including the number of the credit card peculiar to the buyer and the validation period thereof, when the buyer pays for the expendables (i.e., imaging unit, toner, drum, recording paper sheet and the like). The buyer may operate the operation section 11 to choose a seller and input the address to which the expendables should be delivered. The apparatus-status monitoring section 12 keeps monitoring the amount of any expendable used in the facsimile apparatus. When the expendable reduces to a predetermined amount, the apparatus-status monitoring section 12 determines that the expendable must be replenished. The apparatus-status monitoring section 12 supplies the notice data generating section 13 with the data representing this fact. The notice data generating section 13 has a table in which the classification of the apparatus status is corresponded to the name of the data required for the notice. The notice data generating section 13 receives collects not only the data inputted at the operation section 11 and the data supplied from the apparatus-status monitoring section 12, but also apparatus data which should be transmitted to the seller and supplies to the HTTP client section 15. The apparatus data represents a name and serial number of the buyer-side facsimile apparatus 1 automatically generated therein. The HTTP client section 15 converts the data received from the notice data section 13 to data having a format that can be transmitted to the seller-side facsimile 2.

At this time, the buyer-account data is supplied to the SSL encoding section 14 and is concealed. Therefore, the buyer-account data cannot be decoded even if it is wiretapped by a third party, while being transmitted to the seller through the transmission path. The buyer-account data can thus be transmitted in safety. The SSL encoding section 14 sends the buyer-account data, which has been concealed, to the HTTP client section 15. The HTTP client section 15 receives the data and supplies it to the TCP/IP protocol control section 16. The TCP/IP protocol control section 16 sends the data received from the section 15, to the network control section 17, in accordance with the TCP/IP protocol. The network control section 17 performs data link control so that the data received from the TCP/IP protocol control section 16 may reach the gateway 3. The gateway 3 performs routing control in accordance data which represents an HTTP server and which data is received from the buyer-side facsimile apparatus 1. The gateway 3 then transmits the data received from the buyer-side facsimile apparatus 1 to the Internet 5.

Figure 3:
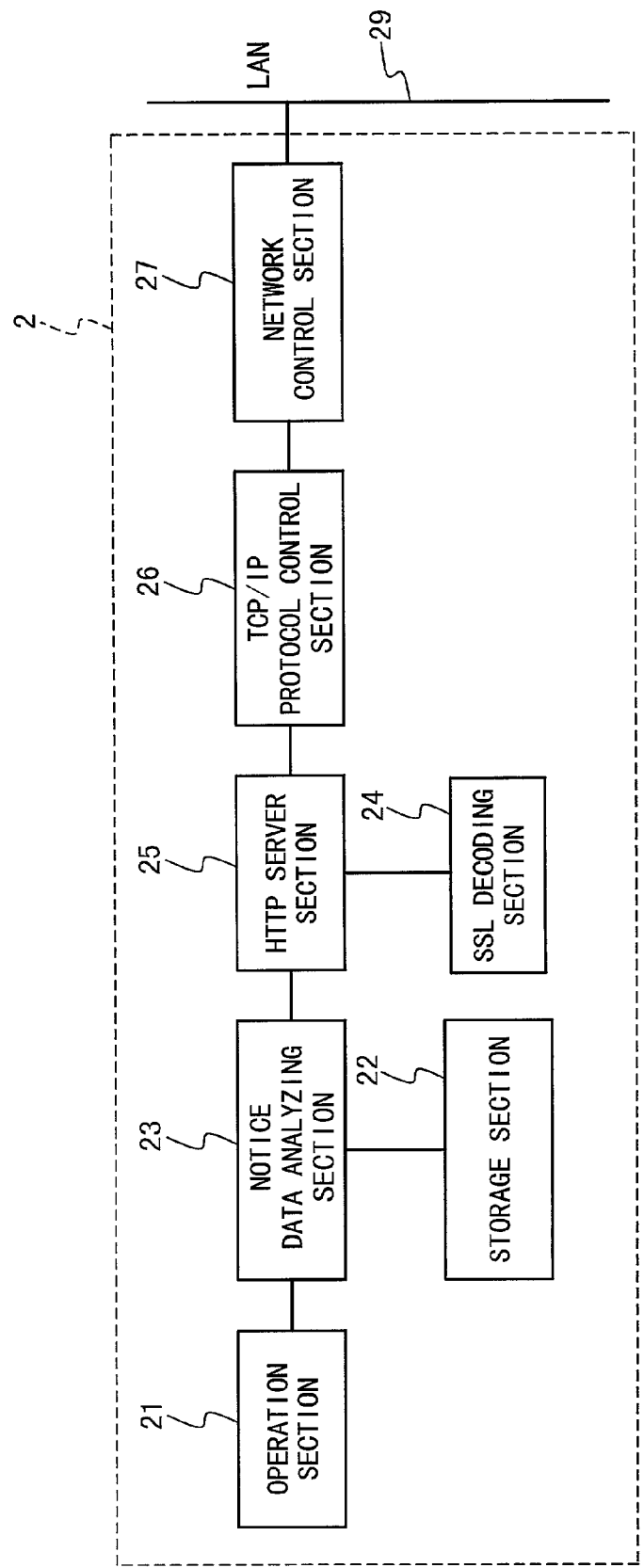
FIG. 3 is a block diagram depicting a configuration of the seller-side facsimile apparatus that is shown in FIG. 1.

FIG. 3 is a block diagram depicting a configuration of the seller-side facsimile apparatus 2. The seller-side facsimile apparatus 2 comprises an operation section 21, a storage section 22, a notice data analyzing section 23, an SSL decoding section 24, an HTTP server section 25, a TCP/IP protocol control section 26, and a network control section 27. As indicated above, the seller-side facsimile apparatus 2 is connected to the LAN 29.

The seller-side facsimile apparatus 2 receives from the Internet 5 the data that the buyer-side facsimile apparatus 1 has transmitted. The order data transmitted from the buyer is supplied from the LAN 29 to the facsimile apparatus 2. In the facsimile apparatus 2, the order data is sent to the HTTP server section 25 via the network control section 27 and the TCP/IP protocol control section 26. The HTTP server section 25 selects the concealed buyer-account data from the data items supplied from the TCP/IP protocol control section 26 and supplies the concealed buyer-account data to the SSL decoding section 24 for decoding the buyer-account data. The SSL decoding section 24 decodes the buyer-account data received from the HTTP server section 25. The buyer-account data decoded is sent to the HTTP server section 25. The HTTP server section 25 receives data from the SSL decoding section 24 and data from the TCP/IP protocol control section 26. The HTTP server section 25 sends both data items to the notice data analyzing section 23. The notice data analyzing section 23 analyzes the data acquired from the HTTP server section 25, and decomposes the data into the component such as the data representing the apparatus, the data representing the expendable ordered, the buyer-account data and the destination data. To ascertain whether the buyer-account data is valid, the seller then inquires for the bank, the credit sales company or any other finance company. If the buyer-account data is valid, the seller will settle an account. If the data is invalid, the seller will inform this fact to the buyer.

If the buyer-account data is valid and if there is stock with sufficient quantities after comparing of whether or not there is stock in the expendable ordered the buyer, the notice data analyzing section 23 outputs the data showing this fact to a shipping department. If there is no stock with sufficient quantities, the notice data analyzing section 23 will send a demand for replenishment to a purchase department. The data or the demand is supplied from the notice data analyzing section 23 to the operation section 21 and the storage section 22.

FIG. 4 illustrates an example of the data about the buyer, which the buyer-side facsimile apparatus 1 has generated. The data about the apparatus and the data about the expendables are previously stored in the buyer-side facsimile apparatus 1. The data concerning the seller represents the address of the seller-side facsimile apparatus 2. The address of the seller-side facsimile apparatus 2 can be selected by the user in accordance with the data stored in the buyer-side facsimile apparatus 1. Alternatively, the user may directly designate the address of the seller's shop. The buyer-account data and the destination data are data items inputted by the user.

As described above, in the account-settling system according to the embodiment of the present invention, the buyer-account data and the expendable-type data that are previously inputted are transmitted to the seller when the expendable reduces to a predetermined amount. Hence, the ordering processing and the settlement processing of expendables can be automatically and safely performed. The data items may not be transmitted via the Internet fails for some cause. In this case, the conventional facsimile communication network can, of course, transmit the data items effectively.

A facsimile apparatus according to the present invention and an account-settling system using the apparatus have been described in detail. Nevertheless, the apparatus and the system are nothing more than embodiments of the invention. It should be noted that the invention is not limited to the facsimile apparatus and the account-settling system. Various changes and modifications can be made to meet specific purposes, without departing from the scope and spirit of the present invention, as may be understood by those skilled in the art.

As may be seen from the above, the facsimile apparatus according to the present invention and the account-settling system using the facsimile apparatus attains the following practical advantages. First, the facsimile apparatus having a function which connects with the Internet can transmit the previously inputted buyer-account data peculiar to the buyer and the expendable-type data to the seller previously selected, when the expendables reduce to a predetermined amount and can perform the ordering processing and the settlement processing of expendables automatically and safely. The buyer and the seller need not talk over telephone to quicken the settlement of an account; they can save time. Additionally, the receipt of an order and the settlement of an account would not be delayed due to human factors. The expendable ordered for can therefore delivered at once. This minimizes the non-operating period of the facsimile apparatus.

Second, small-scale businesses and individual users can buy expendables directly from the seller, without entering a maintenance contract with the maintenance center or the agent. This helps to expand the market for the seller and to simplify the procedure the buyer takes to get the expendable.

Third, the account data peculiar to the user remains unknown to a third party even if wiretapped, because it is SSL-encoded and made secret before transmitted to the seller-side facsimile apparatus, and is decoded in the seller-side facsimile apparatus. This helps to ensure a safe transaction.

What is claimed is:

1. An account-settling system comprising:
a buyer-side facsimile apparatus; and
a seller-side apparatus which is connected to said buyer-side facsimile apparatus through an Internet,
wherein said buyer-side facsimile apparatus comprises:
an operation section which is operated to input account data containing a number of a credit card peculiar to a buyer and a validation period of the credit card;
an apparatus-status monitoring section which monitors a condition of expendables;
a notice data generating section which generates notice data containing said account data inputted from said operation section and expendable-type data of said expendables monitored by said apparatus-status monitoring section to notify to a seller; and an Internet connecting section which converts said notice data generated in said notice data generating section into data having a format to send out in said Internet, and said seller-side apparatus comprises:
a notice data analyzing section which analyzes said notice data received through said Internet from said buyer-side facsimile apparatus and performs settlement based on the analyzing result, said settlement comprising:
sending an inquiry to a financial entity to determine whether said buyer has a valid account; and
a determination whether an expendable item in said notice data is in stock, and if so, automatically forwarding an order to a shipping department, and if not currently in stock, automatically sending an order to a purchasing department.

2. The account-settling system according to claim 1, wherein said buyer-side facsimile apparatus further comprises:
an SSL (Secure Sockets Layer) encoding section which encodes to conceal said account data contained in said notice data generated in said notice data generating section, and
said seller-side apparatus further comprises:
an SSL (Secure Sockets Layer) decoding section which decodes said account data concealed in said coding section and sends the decoded account data to said notice data analyzing section.

3. The account-settling system according to claim 1, wherein said apparatus-status monitoring section, when said expendables reduce to a predetermined amount, sends said expendable-type data of said expendables to be replenished to said notice data generating section.

4. The account-settling system according to claim 3, wherein said buyer-side facsimile apparatus further comprises:
an SSL (Secure Sockets Layer) encoding section which encodes to conceal said account data contained in said notice data generated in said notice data generating section, and
said seller-side apparatus further comprises:
an SSL (Secure Sockets Layer) decoding section which decodes said account data concealed in said coding section and sends the decoded account data to said notice data analyzing section.

5. The account-settling system according to claim 4, wherein said notice data further comprises apparatus data including a name and serial number of said buyer-side facsimile apparatus automatically generated therein and destination data inputted by said operation section.

6. A method for automatically placing an order for expendable items for a facsimile apparatus, said method comprising:
providing an input to permit a user to enter into said facsimile apparatus an account data comprising a number of a credit card peculiar to a buyer and a validation period of the credit card;
saving said account data so that it can be used to automatically place an order to a supplier without having said account data entered for each order by said user;
detecting when an expendable item needs to be ordered;
automatically sending an order for said expendable item to a supplier, using said saved account data to place said order;
receiving said order at a supplier;
analyzing contents of said order;
checking a financial entity to determine that said buyer has a valid account;
determining whether an expendable item in said order is currently in stock; and
automatically sending a request to a shipping department if said expendable item is currently in stock and automatically sending a purchase request to a purchasing department if said expendable item is currently not in stock.

7. The method of claim 6, wherein said order is placed via an Internet connection.

8. The method of claim 6, further comprising:
using an encoder to conceal said account data when placing said order.

9. The method of claim 6, wherein said detecting comprises:
measuring an amount remaining of an expendable item; and
determining that said amount remaining is less than a predetermined amount.

10. The method of claim 8, wherein said encoder comprises a Secure Sockets Layer (SSL).

* * * * *